United States Patent [19]

Nichol

[11] Patent Number: 4,493,480
[45] Date of Patent: Jan. 15, 1985

[54] ELECTRIFIED FENCE GATE

[76] Inventor: Bud Nichol, Box 188 - Star Rte., Winona, Mo. 65588

[21] Appl. No.: 531,865

[22] Filed: Sep. 14, 1983

[51] Int. Cl.³ .............................................. A01K 3/00
[52] U.S. Cl. ..................................... 256/10; 256/23; 49/59
[58] Field of Search ................ 256/10, 13, 23; 49/59, 49/10

[56] References Cited

U.S. PATENT DOCUMENTS

| | | | |
|---|---|---|---|
| 2,476,233 | 7/1949 | Wood | 256/10 |
| 2,642,683 | 6/1953 | Meyer, Jr. | 256/10 X |
| 3,614,844 | 10/1971 | Withers | 256/10 X |
| 3,684,248 | 8/1972 | Maes, Jr. | 256/10 |
| 4,040,604 | 8/1977 | Langlie et al. | 256/10 |

FOREIGN PATENT DOCUMENTS 1023527  6/1963  Fed. Rep. of Germany ........ 256/10
1075153  4/1954  France ................................. 256/10

Primary Examiner—Andrew V. Kundrat
Attorney, Agent, or Firm—John A. Hamilton

[57] ABSTRACT

An electrified fence gate including a tensioned flexible support wire extending horizontally across a fence gate opening, at a height greater than that of vehicles normally intended to pass through the opening, a series of spaced gate wires connected at their upper ends to the support wire and depending closely adjacent but not engaging the road surface, and a fence charger operable to charge the wires with a shocking electric charge. Vehicles, insulated from the ground by their rubber tires, may thus pass freely through the gate without stopping, merely deflecting the hanging wires, but any livestock attempting to pass through, being grounded, will receive an electric shock whenever they touch any of the hanging gate wires, and hence be driven away from the gate.

2 Claims, 4 Drawing Figures

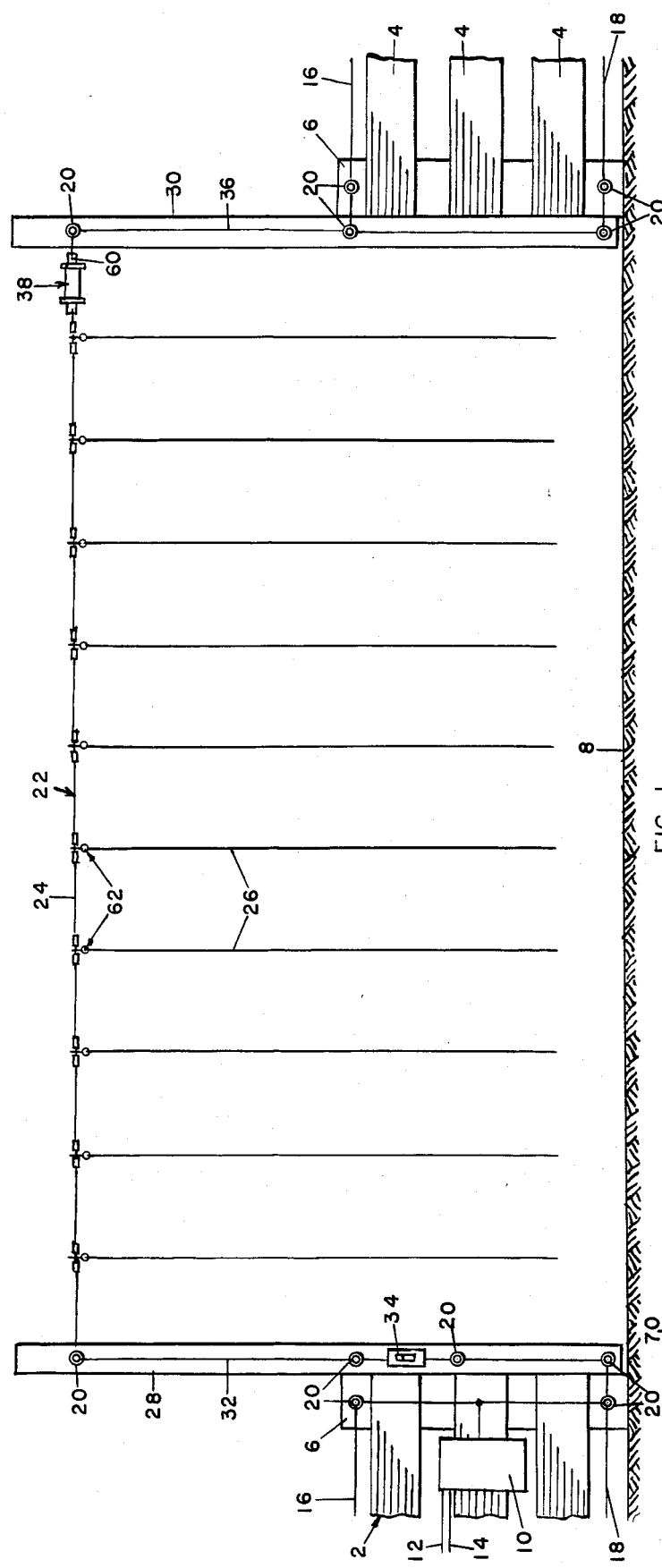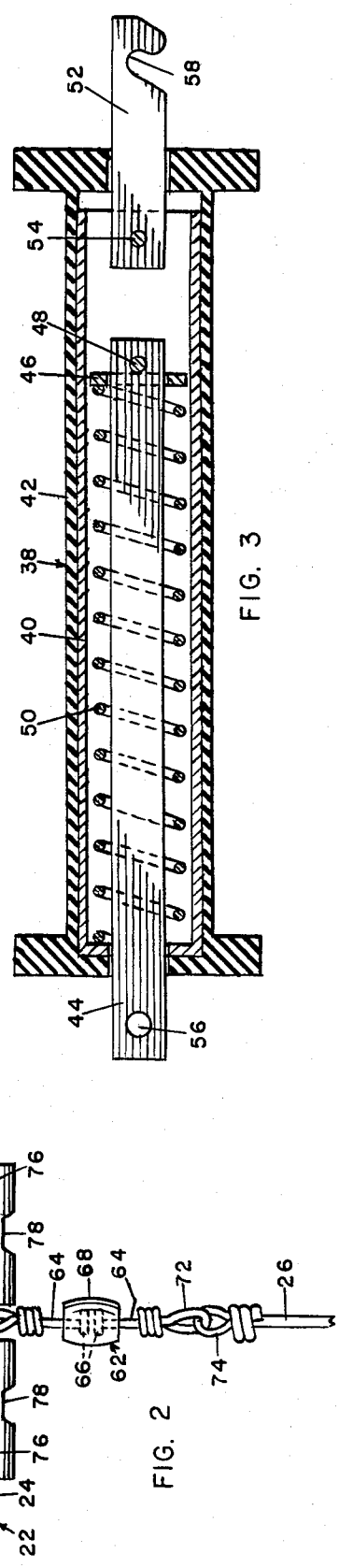

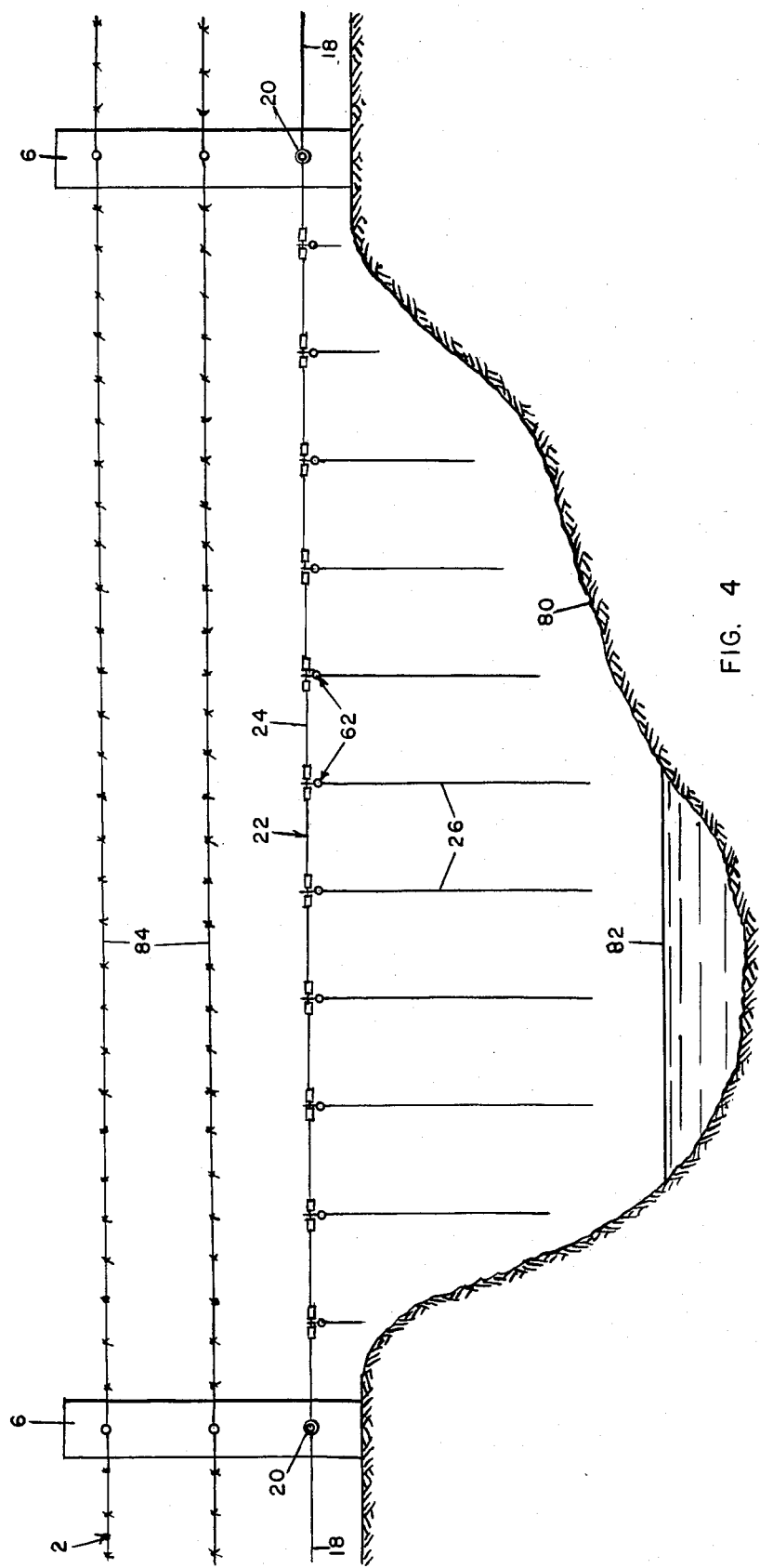

ELECTRIFIED FENCE GATE

This invention relates to new and useful improvements in electrified fence gates, and has as its general object the provision of a gate of this class which, while permitting free passage therethrough of automotive vehicles such as automobiles, trucks and farm vehicles, will nevertheless, by use of electric shock, effectively and reliably prevent the passage of livestock animals through the gate opening. The tedious and time consuming operation of first stopping and getting out of a vehicle, manually opening a gate, then returning to the vehicle and driving it through the gate opening, then again stopping and getting out of the vehicle to close the gate, and also the possibility of the necessity of rounding up and driving any animals which may have escaped through the gate opening back to the right side of the fence if the above steps have not been performed with enough speed, is thus eliminated.

Generally, this object is provided by suspending bare electrically conductive wires vertically in a series spanning the width of the gate opening, said wires being suspended from their upper ends at a height from the ground surface greater than that of vehicles normally intended to pass through the gate, and extending closely adjacent but not engaging the ground surface, and charging said wires electrically with an ordinary electric fence charger. Thus vehicles may pass through freely, merely deflecting the wires, and its occupants will receive no electric shock since the vehicle is insulated from the ground by its tires, but livestock animals will receive an electric shock whenever they touch any of said wires, since they establish an electric circuit from the wires to the ground, and are thus driven away. In fact, they soon learn to give the gate a wide berth, and will not even approach it.

Another object is the provision of an electrified gate of the character described in which the sole support for the depending vertical gate wires of the series constitutes a single horizontally extending support wire stretched between standards disposed at the respective sides of the gate opening. This provides an extremely simple, low cost structure completely eliminating any necessity for the heavy, expensive overhead structures often used in gates of this general type.

Another object is the provision of an electrified gate of the character described in which the horizontal support wire is provided with tensioning means operable to maintain it generally straight, and operable to support the depending vertical wires properly, over long spans, up to perhaps 100 feet. The tensioning device may serve also as a detachable coupling, in order to permit the support wire to be removed from the gate opening in the event a truck having a high load must pass therethrough, and to provide electrical continuity to other portions of the fence.

A further object is the provision of an electrified gate of the character described in which each of the depending vertical wires is suspended from the support wire by a special connecting device which is highly effective in preventing possible catching or fouling of the vertical wires with any portion of a vehicle or other object contacting them. Generally, this connection is such as to permit free pivotal movement of each vertical wire about the support wire as an axis, and also to permit free swivelling of each vertical wire about its own axis.

Other objects are simplicity and economy of construction, efficiency and dependability of operation, and adaptability for use in applications other than the protection of vehicle gates. For example, it is well adapted for use in providing a livestock barrier across creek beds and the like, where it is difficult to build more conventional fences, and where conventional fences would be damaged by floating debris during times of flooding of the creek.

With these objects in view, as well as other objects which will appear in the course of the specification, reference will be had to the accompanying drawing wherein:

FIG. 1 is an elevational view of an electrified fence gate embodying the present invention, shown in operative relationship to a fence having a gate opening formed therein, FIG. 2 is an enlarged fragmentary view detailing the connection of one of the vertical depending gate wires to the horizontal support wire, FIG. 3 is an enlarged longitudinal sectional view of the wire tensioning device disposed in the support wire, and FIG. 4 is a view similar to FIG. 1, but showing the gate spanning a creek bed.

Like reference numerals apply to similar parts throughout the several views, and in FIG. 1, the numeral 2 applies generally to an ordinary farm fence consisting, in this embodiment, of vertically spaced horizontally extending rails 4 fastened to and supported by fence posts 6 fixed in the ground 8, the rails being interrupted between a successive pair of fence posts to form a gate opening therebetween. As shown, the fence itself is electrified by an ordinary, commercially available fence charger 10 supplied with electric current by line wires 12-14, and mounted on the fence at one side of the gate opening. The charger is operable to charge electric wires 16 and 18 strung respectively along the top and bottom of the fence with an electric charge capable of delivering a non-injurious electric shock to any animal contacting both either of wires 16-18 and the ground. These wires do not touch the ground, and are insulated from any grounding contact with the fence structure itself by suitable insulators 20. The gate itself, to be described, provides electrical connection from the fence wires 16-18 at the side of the gate at which charger 10 is disposed to the fence wires 16-18 at the opposite side of the gate.

The electrified gate forming the subject matter of the present invention is indicated generally by the numeral 22, and consists essentially of a generally horizontal support wire 24 and a series of generally vertical gate wires 26 attached to and depending from said support wire, said wires being electrically conductive and bare of insulation. Support wire 24 is preferably disposed at an elevation above ground 8 greater than that of any automotive vehicle to be driven through the gate opening. It is attached at its respective ends to insulators 20 mounted near the upper ends of a pair of standards 28 and 30 fixed to and projecting upwardly from fence posts 6. Its end at standard 28 is connected to fence wires 16-18 by a wire 32 in which is interposed a simple on-off electric switch 34, said switch being mounted on standard 28 at an elevation convenient to a person standing on the ground. The end of support wire 24 at standard 30 is connected to wires 16-18 at that side of the gate by a wire 36.

Support wire 24 is maintained taut, even over long spans, and electrical continuity is maintained throughout its length, by a spring-loaded tensioning device indicated at 38 in FIG. 1 and detailed in FIG. 3, inserted therein preferably adjacent one of standards 28 or 30. Said tensioning device comprises an elongated cup 40 having a covering sheath 42 of insulating material, a bar 44 extending slidably through the base of said cup and having a washer 46 secured on its inner end by a pin 48, a compression spring 50 compressed between washer 46 and the base of cup 40, and a bar 52 secured in the open end of cup 40 by a pin 54 and extending outwardly therefrom. Cup 40, bar 44, washer 46, pin 48, spring 50, bar 52 and pin 54 are all of electrically conductive material. The outer end of bar 44 has a hole 56 formed therein in which an end of support wire 24 may be connected, and the outer end of bar 52 is formed to present a hook 58 which may be engaged releasably in an eye 60 formed by twisting the opposite proximate end of support wire 24. The wire 24 is so selected in length that tensioning spring 50 must be substantially compressed to effect the attachment of hook 58 in eye 60.

Each of the depending gate wires 26 is attached to support wire 24 by means best shown in FIG. 2, and including a swivel connector 62. As detailed in FIG. 2, said connector includes a pair of coaxially aligned wires 64 having enlarged heads 66 at their contiguous ends enclosed in a body member 68 for free relative rotation about the axes of wires 64. The extended end of one of wires 64 is formed to present an eye 70 engaged loosely about support wire 24, and the extended end of the other of wires 64 is formed to present an eye 72 engaged loosely in an eye 74 formed by twisting the upper end portion of the associated gate wire 26. The swivel connectors 62 are formed of electrically conductive metal. Eye 70 is secured against appreciable movement along wire 24, but still permitted to pivot universally thereon, by a pair of sleeves 76 engaged about wire 24, and secured tightly thereon, after the desired position of the associated gate wire 26 has been determined, by crimping thereof as indicated at 78. The lower ends of wires 26 hang closely adjacent, but do not engage, ground 8.

In operation, it will be seen that with the gate 22 set up as shown in FIG. 1, with its wires 24 and 26 electrically charged by operation of fence charger 10 and closure of switch 34, any rubber-tired vehicle may be driven freely through the gate, the vehicle occupants being protected against any possibility of electric shock by the fact that the vehicle is insulated from the ground by its tires. The vehicle simply swings wires 26 forwardly, and/or deflects them laterally outwardly, so that they drag over the vehicle body. Said wires should be of sufficiently light weight that they will not scratch or otherwise damage the finish of the vehicle body. On the other hand, any livestock animal attempting to pass through the gate will engage at least one of wires 26, and since it is in contact with the ground, it will immediately be subjected to an electric shock. While not lethal or even injurious to the animal in any way, the shock is sufficient to cause the animal to recoil away from the gate without passing therethrough. In fact, it has been found in most cases the animals soon become fully aware of the unpleasant consequences of approaching the gate, and will thereafter give it a wide berth even if the electric power should be turned off for substantial periods of time. A human on foot may pass freely through the gate merely by opening switch 34, walking through, and reaching back to close the switch. A truck having a height, or carrying a load having a height above the ground greater than the elevation of support wire 24, may be accomodated simply by disconnecting tension device 38 and moving all of the gate wires to one side to leave the gate opening unobstructed, and reconnecting the tension device after the high load has passed through the opening. Disconnecting connector 38 of course leaves the fence wires 16–18 to the right of the gate (as shown in FIG. 1) temporarily uncharged. This is not ordinarily considered to be objectionable, but if desired, the wires 16–18 can be connected across the gate by an insulated conductor wire (not shown) buried beneath the ground surface, so that switch 34 controls only the gate itself.

Thus it will be seen that an electrified fence gate having several advantages has been produced. The use of a single flexible wire (support wire 24) as the structural basis of the entire gate, this single wire being unsupported except at its ends, provides an extremely simple, economical structure, eliminating the heavy, expensive support structures usually necessary in gates of this general type. It also permits application of the gate to very wide gate openings, tensioning device 38 being easily capable of supporting wire 24 in a generally straight, horizontal attitude, against the weight of gate wires 26, over spans of at least 100 feet. The tensioning device also, as already described, permits complete opening of the gate to permit passage of high vehicles or loads, and provides electrical continuity across the gate opening.

The connection of gate wires 26 to wire 24 by swivel connectors 62 and sleeves 76 also has certain advantages. The sleeves permit ready and convenient setting of the spacing between wires 26 to accomodate livestock animals of different sizes, said wires obviously requiring a lesser spacing to properly confine smaller animals than is required for larger animals. The universal pivotability of wires 26 on wire 24 provided by eyes 70 permits greater freedom of movement of wires 26 as they are deflected by vehicles passing through the gate. The freedom of each wire 26 to turn about its own axis, as provided by swivel connectors 62, has been found highly effective in reducing any tendency of said wires to become fouled or entangled with portions of a vehicle, or with parts of a load being carried by a vehicle, as the vehicle passes through the gate. This tendency of wires 26 to become fouled or entangled, while normally slight so long as they remain straight, becomes more pronounced if the wires, through extended use, become bent or kinked. Such bent of kinked wires, if initially caught or trapped on some part of a vehicle or its load, often "spin" free of the engagement if they are free to turn on their axes. Another advantage of the swivel connectors 62 is that they permit wires 26 to turn or rotate at random in response to wind or breezes impingeing thereagainst. If said wires are polished or reflective, as is usually the case, this rotation causes them to present a glittering or shimmering appearance. This shimmering appearance serves as a further reminder to livestock to stay clear of the gate, if they have previously been subjected to electric shock.

FIG. 4 shows application of the present gate for use in spanning a creek bed 80 or the like, with the normal water level of the creek flowing therein being indicated at 82. As shown, the fence 2 comprises strands of barbed wire 84 extending between a pair of fence posts 6 disposed respectively at opposite sides of the creek bed, together with a support wire 24 carrying gate wires 26 in the same manner as support wire 24 in FIG. 1. In FIG. 4, wire 24 is a segment of an electrified fence wire 18. Wires 26 are clipped to approach but not normally contact the water or any other portion of the creek bed. It will of course be understood that wire 18-24 is electrically charged by a fence charger such as charger 10 of FIG. 1, and that wire 24 could be equipped with a tensioning device such as shown at 38 in FIG. 1, although in this application it is not generally necessary. In this case the "gate opening" is the contour of the creek bed below the fence, and it is protected by wires 26 to prevent livestock from passing therethrough to traverse the fence line. It is difficult and expensive to build a conventional fence to conform to the contour of creek beds or other sharp depressions in the ground surface, and such conventional fences are often clogged and even torn out by debris carried by the creek during times of flooding and high water. With the present gate, the wires 26 effectively bar passage of livestock beneath a fence which does not follow the ground contour, during periods of normal or low water level, but swing freely forwardly and upwardly to permit passage of floating debris during periods of high water level. Of course, a high water level may establish ground contact for some of wires 26 over substantial periods of time, but this is not ordinarily considered to be objectionable, and is not even particularly wasteful of electric power, because the electric current deliverable by most fence chargers is of very low amperage, in order to avoid actual injury to livestock animals, and because said current is normally delivered only at pulsed intervals.

While I have shown and described certain specific embodiments of my invention, it will be readily apparent that many minor changes of structure and operation could be made without departing from the spirit of the invention.

What I claim as new and desire to protect by Letters Patent is:

1. An electrified fence gate comprising:
   a. a single flexible electrically conductive support wire extending generally horizontally and spanning a gate opening of a fence above ground level, said support wire being secured at its ends to elements of said fence but being otherwise unsupported,
   b. a series of flexible, electrically conductive gate wires each connected at its upper end to said support wire by means operable to permit free universal pivotal movement of the former relative to the latter, and additionally operable to permit swivelling of said gate wire about its own axis relative to said support wire.

2. An electrified fence gate as recited in claim 1 wherein said means connecting each of said gate wires to said support wire comprises:
   a. a swivel body member,
   b. a pair of swivel wires disposed in end-to-end generally coaxial relation, their contiguous ends being engaged in said swivel body for independent axial rotation, the outer end of one of said swivel wires being formed to present an eye loosely engaged about said support wire for free universal pivotal movement relative thereto, and the outer end of the other of said swivel wires being connected to the upper end of the associated gate wire, and
   c. a pair of stop sleeves carried on said support wire respectively at opposite sides of said swivel wire eye, said sleeves being originally movable along said support wire but being fixable thereon by crimping thereof to engage said support wire tightly.

* * * * *